(12) United States Patent
Zhong et al.

(10) Patent No.: US 12,221,575 B2
(45) Date of Patent: Feb. 11, 2025

(54) METHOD FOR PREPARING ZnSe QUANTUM DOT, ZnSe QUANTUM DOT, ZnSe STRUCTURE AND DISPLAY DEVICE

(71) Applicant: BOE TECHNOLOGY GROUP CO., LTD., Beijing (CN)

(72) Inventors: Haizheng Zhong, Beijing (CN); Zhiwei Long, Beijing (CN); Gaoling Yang, Beijing (CN); Kai Gu, Beijing (CN); Yang Liu, Beijing (CN); Zhuo Chen, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 635 days.

(21) Appl. No.: 17/598,638

(22) PCT Filed: Dec. 25, 2020

(86) PCT No.: PCT/CN2020/139548
§ 371 (c)(1),
(2) Date: Sep. 27, 2021

(87) PCT Pub. No.: WO2022/134044
PCT Pub. Date: Jun. 30, 2022

(65) Prior Publication Data
US 2022/0396729 A1 Dec. 15, 2022

(51) Int. Cl.
*C09K 11/88* (2006.01)
*B82Y 40/00* (2011.01)
(Continued)

(52) U.S. Cl.
CPC ............ *C09K 11/883* (2013.01); *B82Y 40/00* (2013.01); *C01B 19/04* (2013.01); *C01G 9/00* (2013.01)

(58) Field of Classification Search
CPC ........ C09K 11/883; B82Y 40/00; C01G 9/00; C01B 19/04
See application file for complete search history.

(56) References Cited

U.S. PATENT DOCUMENTS

| 5,260,957 A | 11/1993 | Hakimi et al. |
| 2008/0048571 A1 | 2/2008 | Yoon et al. |
| | (Continued) | |

FOREIGN PATENT DOCUMENTS

| CN | 1657589 | * | 8/2005 |
| CN | 1657589 A | | 8/2005 |
| | (Continued) | | |

OTHER PUBLICATIONS

Wang, Aqiang, et al., "Bright, efficient, and color-stable violet ZnSe-based quantum dot light-emitting diodes", Nanoscale, 2015, 7, Jan. 5, 2015, pp. 2951-2959.*
(Continued)

*Primary Examiner* — C Melissa Koslow
(74) *Attorney, Agent, or Firm* — Myers Bigel, P.A.

(57) ABSTRACT

A method for preparing a ZnSe quantum dot, a ZnSe quantum dot, a ZnSe structure and a display device are provided. The method includes preparing a first zinc precursor solution, a second zinc precursor solution, a first selenium precursor solution, and a second selenium precursor solution with a lower reaction activity than the first selenium precursor solution, adding the first selenium precursor solution to the second zinc precursor solution to form an intermediate of the ZnSe quantum dot, performing the following operation at least once to form the ZnSe quantum dot: sequentially adding the first zinc precursor solution and the second selenium precursor solution to the intermediate of the ZnSe quantum dot and making the first zinc precursor
(Continued)

solution, the second selenium precursor solution, and the intermediate of the ZnSe quantum dot react.

20 Claims, 4 Drawing Sheets

(51) Int. Cl.
  *C01B 19/04* (2006.01)
  *C01G 9/00* (2006.01)

(56) References Cited

U.S. PATENT DOCUMENTS

| | | | |
|---|---|---|---|
| 2009/0065742 | A1 | 3/2009 | Shih et al. |
| 2014/0353579 | A1* | 12/2014 | Greco ............... H01L 33/28 977/890 |
| 2017/0066965 | A1* | 3/2017 | Truskier ............... C09K 11/883 |
| 2017/0306227 | A1 | 10/2017 | Ippen et al. |
| 2018/0095327 | A1 | 4/2018 | Lee et al. |
| 2018/0130853 | A1 | 5/2018 | Pan |
| 2020/0407635 | A1 | 12/2020 | Kim et al. |
| 2021/0210706 | A1 | 7/2021 | Yu et al. |

FOREIGN PATENT DOCUMENTS

| | | |
|---|---|---|
| CN | 1834198 A | 9/2006 |
| CN | 1865394 A | 11/2006 |
| CN | 101260294 A | 9/2008 |
| CN | 101264868 A | 9/2008 |
| CN | 101428770 A | 5/2009 |
| CN | 101332979 B | 6/2010 |
| CN | 101824317 A | 9/2010 |
| CN | 101428770 B | 5/2011 |
| CN | 103130201 A | 6/2013 |
| CN | 103215034 A | 7/2013 |
| CN | 103694997 A | 4/2014 |
| CN | 104409592 A | 3/2015 |
| CN | 107384405 A | 11/2017 |
| CN | 109370564 A | 2/2019 |
| CN | 110137363 A | 8/2019 |
| CN | 110408398 A | 11/2019 |
| CN | 110790242 A | 2/2020 |
| CN | 111019628 A | 4/2020 |
| CN | 111019656 A | 4/2020 |
| CN | 111117622 A | 5/2020 |
| CN | 111218269 A | 6/2020 |
| CN | 112745852 A | 5/2021 |
| CN | 112824477 A | 5/2021 |
| CN | 114981385 A | 8/2022 |
| WO | 2017034226 A1 | 3/2017 |
| WO | WO 2019/074083 * | 4/2019 |

OTHER PUBLICATIONS

Extended European Search Report corresponding to European Patent Application No. 20966609.8 (11 pages) (dated Nov. 8, 2023).
Qin, et al., "A simple and novel route for the synthesis of water soluble ZnSe quantum dots using the Nano-Se as the reaction intermediate", Materials Letters, 2012, 67:28-31.
Zhang, et al., "ZnSe Nanostructures: Synthesis, Properties and Applications", Progress in Materials Science, 2016, 83:472-535.
Huang, Ao-Dong, et al., "Phosphine-free Synthesis of Alloyed Zns1—xSex Quantum Dots with Tunable Bandgap Emissions (with English language translation)", Journal of Ningbo University of Technology, vol. 25, No. 4, Dec. 2013, 16 pp.
Li, Lin Song, et al., "High Quality ZnSe and ZnS Nanocrystals Formed by Activating Zinc Carboxylate Precursors", Nano Letters, vol. 4, No. 11, Oct. 14, 2004, pp. 2261-2264.
Ryowa, Tatsuya, et al., "High-efficiency quantum dot light-emitting diodes with blue cadmium-free quantum dots", Journal of Society for Information Display, vol. 28, No. 5, May 1, 2020, pp. 401-409.
Shen, Huaibin, et al., "Phosphine-free synthesis of high quality ZnSe, ZnSe/ZnS, and Cu-, Mn-doped ZnSe nanocrystals", Dalton Transactions, 2009, 47, Oct. 30, 2009, pp. 10534-10540.
Shen, Huaibin, et al., "Size- and shape-controlled synthesis of ZnSe nanocrystals using SeO2 as selenium precursor", Dalton Transactions, 2010, 39, Oct. 26, 2010, pp. 11432-11438.
Wang, Aqiang, et al., "Bright, Efficient, and Color-stable Violet ZnSe-Based Quantum Dots Light-Emitting Diodes", Nanoscale, 2015, 7, Jan. 5, 2015, pp. 2951-2959.
Yu, Kui, et al., "Highly-photoluminescent ZnSe nanocrystals via a non-injection-based approach with precursor reactivity elevated by a secondary phosphine", Chemical Communications, 2011, 47, Jul. 7, 2011, pp. 8811-8813.
First Office Action of Chinese patent application 202280000426.X (14 pages) (May 23, 2024).
Second Office Action of Chinese Patent Application No. 202280000426.X (12 pages) (Oct. 29, 2024).

* cited by examiner

METHOD FOR PREPARING ZnSe QUANTUM DOT, ZnSe QUANTUM DOT, ZnSe STRUCTURE AND DISPLAY DEVICE

RELATED APPLICATIONS

The present application is a 35 U.S.C. 371 national stage application of PCT International Application No. PCT/CN2020/139548 filed on Dec. 25, 2020, the entire disclosure of which is incorporated herein by reference.

TECHNICAL FIELD

The present disclosure relates to the technical field of nanomaterials, in particular to a method for preparing a ZnSe quantum dot, a ZnSe quantum dot, a ZnSe structure comprising the ZnSe quantum dot, and a display device comprising the ZnSe quantum dot or the ZnSe structure.

BACKGROUND

A semiconductor quantum dot, also known as a semiconductor nanocrystal, has attracted wide attention due to its adjustable fluorescence emission peak position, narrower full width at half maximum, and higher fluorescence quantum yield. The quantum dot has a specific band gap according to its composition and size, and therefore can absorb light and emit light having an inherent wavelength. Currently, the widely researched blue-emitting quantum dot for display applications is mainly II-VI group semiconductor quantum dot, such as CdSe quantum dot. However, CdSe quantum dot contains heavy metal ions $Cd^{2+}$, which is highly toxic and has serious environmental pollution, which limits its application in the field of biological detection and display. In contrast, semiconductor quantum dot based on the ZnSe system has advantages such as no heavy metal ions, better biocompatibility, and better tunability of fluorescence emission peak positions, so it is regarded as one of the very promising competitors to replace the cadmium-based quantum dot.

SUMMARY

According to an aspect of the present disclosure, a method for preparing a ZnSe quantum dot is provided, comprising the following steps: preparing a first zinc precursor solution, a second zinc precursor solution, a first selenium precursor solution, and a second selenium precursor solution with a lower reaction activity than the first selenium precursor solution; adding the first selenium precursor solution to the second zinc precursor solution to form an intermediate of the ZnSe quantum dot; performing the following step at least once to form the ZnSe quantum dot: sequentially adding the first zinc precursor solution and the second selenium precursor solution to the intermediate of the ZnSe quantum dot and making them react.

In some embodiments, a ratio of solute to solvent in the first zinc precursor solution is different from a ratio of solute to solvent in the second zinc precursor solution.

In some embodiments, a fluorescence emission peak of the ZnSe quantum dot is in a range of 455~470 nm.

In some embodiments, a particle size of the ZnSe quantum dot is in a range of 10~15 nm.

In some embodiments, a full width at half maximum of the fluorescence of the ZnSe quantum dot is less than 30 nm.

In some embodiments, the step of preparing a first zinc precursor solution, a second zinc precursor solution, a first selenium precursor solution, and a second selenium precursor solution with a lower reaction activity than the first selenium precursor solution comprises: mixing a selenium precursor and a first selenium precursor solvent in a ratio of 0.1~10 mmol:1~20 mL to form the first selenium precursor solution.

In some embodiments, the step of preparing a first zinc precursor solution, a second zinc precursor solution, a first selenium precursor solution, and a second selenium precursor solution with a lower reaction activity than the first selenium precursor solution comprises: mixing a selenium precursor and a second selenium precursor solvent in a ratio of 0.1~10 mmol:1~20 mL to form the second selenium precursor solution.

In some embodiments, the selenium precursor is selected from one of selenium dioxide, selenium trioxide, selenium powder, and sodium selenate.

In some embodiments, the first selenium precursor solvent comprises a phosphine solvent with active electrons.

In some embodiments, the phosphine solvent is selected from one of trioctylphosphine, tributylphosphine, tris(trimethylsilyl)phosphine, tris(dimethylamino)phosphine, diphenylphosphine, diethylphosphine, bis(2-methoxyphenyl)phosphine, and tris(diethylamino)phosphine.

In some embodiments, the second selenium precursor solvent comprises an inert solvent.

In some embodiments, the step of preparing a first zinc precursor solution, a second zinc precursor solution, a first selenium precursor solution, and a second selenium precursor solution with a lower reaction activity than the first selenium precursor solution comprises: mixing zinc inorganic salt, organic acid, organic amine and inert solvent in a ratio of 1~10 mmol:1~10 mmol:1~10 mL:10~50 mL, stirring the mixture under the protection of inert gas and heating the mixture until clear to form the first zinc precursor solution.

In some embodiments, the step of preparing a first zinc precursor solution, a second zinc precursor solution, a first selenium precursor solution, and a second selenium precursor solution with a lower reaction activity than the first selenium precursor solution comprises: mixing zinc inorganic salt, organic acid, organic amine and inert solvent in a ratio of 0.1~10 mmol:1~10 mL:1~10 mL:1~20 mL, stirring the mixture under the protection of inert gas and heating the mixture to 250° C.~350° C. to form the second zinc precursor solution.

In some embodiments, the inert solvent is selected from one of tetradecane, hexadecane, octadecane, eicosane, tetracosane, octadecene, phenyl ether, benzyl ether, liquid paraffin, mineral oil, dodecylamine, hexadecylamine, and octadecylamine.

In some embodiments, the step of adding the first selenium precursor solution to the second zinc precursor solution to form an intermediate of the ZnSe quantum dot comprises: quickly injecting the first selenium precursor solution into the second zinc precursor solution and reacting for 1 minute to 3 hours to form the intermediate of the ZnSe quantum dot with a particle size in a range of 3~10 nm. A volume ratio of the first selenium precursor solution to the second zinc precursor solution is in a range of 0.1~20:0.3~40.

In some embodiments, the step of performing the following step at least once to form the ZnSe quantum dot comprises: under 250° C.~350° C., sequentially adding the first zinc precursor solution at room temperature and the second selenium precursor solution at room temperature to the intermediate of the ZnSe quantum dot, and reacting for 1 minute to 2 hours, repeating this step at least once to form the ZnSe quantum dot.

According to another aspect of the present disclosure, a ZnSe quantum dot prepared by the method described in any of the foregoing embodiments is provided.

In some embodiments, a fluorescence emission peak of the ZnSe quantum dot is in a range greater than 455 nm and less than or equal to 470 nm.

In some embodiments, a particle size of the ZnSe quantum dot is in a range of 10~15 nm.

In some embodiments, a full width at half maximum of the fluorescence of the ZnSe quantum dot is less than 30 nm.

According to still another aspect of the present disclosure, a ZnSe structure comprising the ZnSe quantum dot described in any of the foregoing embodiments and at least one shell covering a surface of the ZnSe quantum dot is provided.

In some embodiments, a material of the at least one shell is selected from one or more of ZnS, ZnTe, ZnSeS, ZnSeTeS, ZnSeTe, CdS, CdSe, CdSeS, and InP.

According to still another aspect of the present disclosure, a display device comprising the ZnSe quantum dot described in any of the foregoing embodiments or the ZnSe structure described in any of the foregoing embodiments is provided.

BRIEF DESCRIPTION OF THE DRAWINGS

In order to more clearly describe the technical solutions in the embodiments of the present disclosure, the following will briefly introduce the drawings that need to be used in the embodiments. Obviously, the drawings in the following description are only some embodiments of the present disclosure. For those of ordinary skill in the art, other drawings can be obtained based on these drawings without creative work.

DETAILED DESCRIPTION OF THE DISCLOSURE

The technical solutions in the embodiments of the present disclosure will be clearly and completely described below in conjunction with the drawings in the embodiments of the present disclosure. Obviously, the described embodiments are only a part of the embodiments of the present disclosure. Based on the embodiments in the present disclosure, all other embodiments obtained by those of ordinary skill in the art without creative work shall fall within the protection scope of the present disclosure.

The application of semiconductor nanocrystals to electroluminescent diodes and display devices, especially blue-emitting diodes, still has great technical challenges. The main challenge is that it is very difficult to prepare blue-emitting quantum dot for display applications with a fluorescence emission peak in the range of 455~470 nm and a full width at half maximum of less than 30 nm. The inventor(s) noticed that the particle size of the existing ZnSe quantum dot is less than 10 nm, and the fluorescence emission peak of the existing ZnSe quantum dot cannot reach the above-mentioned range of 455~470 nm. Blue light with a wavelength range of 400~450 nm belongs to harmful blue light, which is relatively harmful to human eyes. So far, no one has been able to prepare blue-emitting ZnSe quantum dot for display applications with a fluorescence emission peak in the range of 455~470 nm and a particle size greater than 10 nm.

Figure 1:
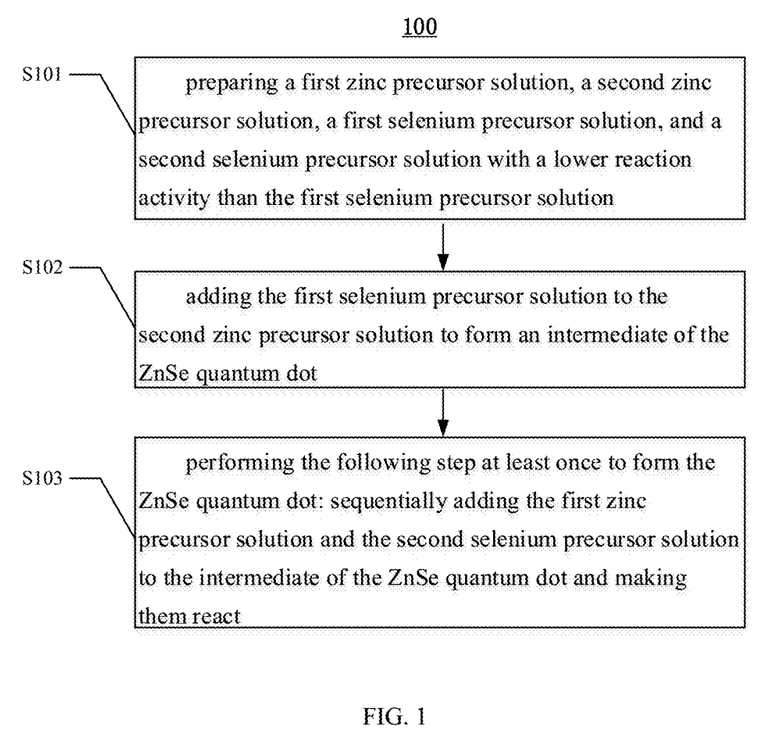
FIG. 1 illustrates a flowchart of a method for preparing a ZnSe quantum dot according to an embodiment of the present disclosure.

Based on this, according to one aspect of the present disclosure, a method for preparing a ZnSe quantum dot is provided. As illustrated in FIG. 1, the method 100 comprises the following steps: Step S101, preparing a first zinc precursor solution, a second zinc precursor solution, a first selenium precursor solution, and a second selenium precursor solution with a lower reaction activity than the first selenium precursor solution; step S102, adding the first selenium precursor solution to the second zinc precursor solution to form an intermediate of the ZnSe quantum dot; step S103, performing the following step at least once to form the ZnSe quantum dot: sequentially adding the first zinc precursor solution and the second selenium precursor solution to the intermediate of the ZnSe quantum dot and making them react.

It should be noted that in the embodiments of the present disclosure, terms such as "reaction activity" and "activity" refer to the degree of activity of a chemical reagent or precursor solution in a chemical reaction. The higher the reaction activity or the activity, the easier it is to react. For example, a reactant with high reaction activity refers to a reactant with a higher degree of reactivity, and a reactant with low reaction activity refers to a reactant with a lower degree of reactivity. Therefore, in step S101, the phrase "a second selenium precursor solution with a lower reaction activity than the first selenium precursor solution" means that the reactivity of the second selenium precursor solution is less than the reactivity of the first selenium precursor solution. That is, the reaction activity degree of the second selenium precursor solution is lower than the reaction activity degree of the first selenium precursor solution. The terms "reaction activity" and "activity" are used interchangeably herein.

It should also be noted that in the embodiments of the present disclosure, the term "intermediate" refers to the intermediate product(s) of a certain product obtained in the chemical synthesis process. Therefore, in step S102, the phrase "intermediate of ZnSe quantum dot" refers to the intermediate product(s) of finally formed ZnSe quantum dot during the chemical synthesis process.

In this method 100, by first adding the first selenium precursor solution with higher reaction activity to form the intermediate of ZnSe quantum dot, and then adding the second selenium precursor solution with lower reaction activity to form the ZnSe quantum dot, the ZnSe quantum dot can be formed with the required particle size range and the fluorescence emission peak range.

In some embodiments, the ratio of solute to solvent in the first zinc precursor solution is different from the ratio of solute to solvent in the second zinc precursor solution. The term "solute" as used herein refers to a substance that is dissolved by a solvent in a solution, and the term "solvent" refers to a reagent in which the solute is dispersed. The solute can contain one or more different substances, and the solvent can also contain one or more different reagents. "The ratio of solute to solvent in the first zinc precursor solution is different from the ratio of solute to solvent in the second zinc precursor solution" can comprise the following situations: the amount of solute in the first zinc precursor solution is the same as the amount of solute in the second zinc precursor solution, but the amount of solvent in the first zinc precursor solution is different from the amount of solvent in the second zinc precursor solution, in this case, the ratio of solute to solvent in the first zinc precursor solution is different from the ratio of solute to solvent in the second zinc precursor solution; the amount of solute in the first zinc precursor solution is different from the amount of solute in the second zinc precursor solution, but the amount of solvent in the first zinc precursor solution is the same as the amount of solvent in the second zinc precursor solution, in this case, the ratio of solute to solvent in the first zinc precursor solution is different from the ratio of solute to solvent in the second zinc precursor solution; and the amount of solute in the first zinc precursor solution is different from the amount of solute in the second zinc precursor solution, and the amount of solvent in the first zinc precursor solution is also different from the amount of solvent in the second zinc precursor solution, in this case, the ratio of solute to solvent in the first zinc precursor solution is different from the ratio of solute to solvent in the second zinc precursor solution.

In some embodiments, preparing the first zinc precursor solution in step S101 may comprise the following sub-steps: mixing zinc inorganic salt, organic acid, organic amine and inert solvent in a ratio of 1~10 mmol:1~10 mmol:1~10 mL:10~50 mL, stirring the mixture under the protection of inert gas and heating the mixture until clear to form the first zinc precursor solution. It should be noted that the phrase "mixing zinc inorganic salt, organic acid, organic amine and inert solvent in a ratio of 1~10 mmol:1~10 mmol:1~10 mL:10~50 mL" means that in the synthesis process, the actual amount of zinc inorganic salt is 1~10 mmol, the actual amount of organic acid is 1~10 mmol, the actual amount of organic amine is 1~10 mL, and the actual amount of inert solvent is 10~50 mL. Or, it means that in the synthesis process, the actual amount of zinc inorganic salt is $x*(1~10$ mmol), the actual amount of organic acid is $x*(1~10$ mmol), the actual amount of organic amine is $x*(1~10$ mL) and the actual amount of inert solvent is $x*(10~50$ mL), where $x>0$, that is, 1~10 mmol:1~10 mmol:1~10 mL:10~50 mL is not necessarily the ratio of the actual amount of zinc inorganic salt:organic acid:organic amine:inert solvent, and it may be the ratio of their actual amount after taking the common divisor or common multiple. For example, when the value of x is 2, the actual amount of zinc inorganic salt can be 2~20 mmol, the actual amount of organic acid can be 2~20 mmol, the actual amount of organic amine can be 2~20 mL and the actual amount of inert solvent can be 20~100 mL. Whether it is laboratory synthesis or actual large-scale process production, the method and raw materials provided in this step can be satisfied.

In this step, the zinc inorganic salt is referred to as the solute in the first zinc precursor solution, and the organic acid, organic amine and inert solvent are referred to as the solvent in the first zinc precursor solution. The zinc inorganic salt can be selected from one of inorganic salts such as zinc chloride, zinc bromide, zinc iodide, zinc oxide, zinc nitrate, zinc acetate, zinc laurate, zinc myristate, and zinc stearate. The organic acid may be selected from one of organic acids such as valeric acid, stearic acid, oleic acid, palmitic acid, levulinic acid, lactic acid, and 3-hydroxypropionic acid. The organic amine can be selected from one of reagents such as oleylamine, stearylamine, dodecylamine, and octylamine. The inert solvent can be an inert organic solvent with a boiling point higher than 200° C., comprising but not limited to tetradecane, hexadecane, octadecane, eicosane, tetracosane, octadecene, phenyl ether, benzyl ether, liquid paraffin, mineral oil, dodecylamine, hexadecylamine, octadecylamine.

In some embodiments, preparing the second zinc precursor solution in step S101 may comprise the following sub-steps: mixing zinc inorganic salt, organic acid, organic amine and inert solvent in a ratio of 0.110 mmol:1~10 mL:1~10 mL:1~20 mL, stirring the mixture under the protection of inert gas and heating the mixture to 250° C.~350° C. to form the second zinc precursor solution. Similar to the first zinc precursor solution, the phrase "mixing zinc inorganic salt, organic acid, organic amine and inert solvent in a ratio of 0.1~10 mmol:1~10 mL:1~10 mL:1~20 mL" means that in the synthesis process, the actual amount of zinc inorganic salt is 0.1~10 mmol, the actual amount of organic acid is 1~10 mL, the actual amount of organic amine is 1~10 mL, and the actual amount of inert solvent is 1~20 mL. Or, it means that in the synthesis process, the actual amount of zinc inorganic salt is $x*(0.1~10$ mmol), the actual amount of organic acid is $x*(1~10$ mL), the actual amount of organic amine is $x*(1~10$ mL) and the actual amount of inert solvent is $x*(1~20$ mL), where $x>0$, that is, 0.1~10 mmol:1~10 mL:1~10 mL:1~20 mL is not necessarily the ratio of the actual amount of zinc inorganic salt:organic acid:organic amine:inert solvent, and it may be the ratio of their actual amount after taking the common divisor or common multiple. For example, when the value of x is 2, the actual amount of zinc inorganic salt can be 0.2~20 mmol, the actual amount of organic acid can be 2~20 mL, the actual amount of organic amine can be 2~20 mL and the actual amount of inert solvent can be 2~40 mL. Whether it is laboratory synthesis or actual large-scale process production, the method and raw materials provided in this step can be satisfied.

In this step, the zinc inorganic salt is referred to as the solute in the second zinc precursor solution, and the organic acid, organic amine and inert solvent are referred to as the solvent in the second zinc precursor solution. The zinc inorganic salt can be selected from one of inorganic salts such as zinc chloride, zinc bromide, zinc iodide, zinc oxide, zinc nitrate, zinc acetate, zinc laurate, zinc myristate, and zinc stearate. The organic acid may be selected from one of organic acids such as valeric acid, stearic acid, oleic acid, palmitic acid, levulinic acid, lactic acid, and 3-hydroxypropionic acid. The organic amine can be selected from one of reagents such as oleylamine, stearylamine, dodecylamine, and octylamine. The inert solvent can be an inert organic solvent with a boiling point higher than 200° C., comprising but not limited to tetradecane, hexadecane, octadecane, eicosane, tetracosane, octadecene, phenyl ether, benzyl ether, liquid paraffin, mineral oil, dodecylamine, hexadecylamine, octadecylamine. It should be noted that the ratio of zinc inorganic salt, organic acid, organic amine and inert solvent in the second zinc precursor solution is different from the ratio of zinc inorganic salt, organic acid, organic amine and inert solvent in the first zinc precursor solution. Through this ratio control, it is beneficial to make the particle size of the formed ZnSe quantum dot cover all the particle size in the required range, and it is beneficial to make the fluorescence emission peak of the formed ZnSe quantum dot cover all the fluorescence emission peak in the required range.

In some embodiments, the preparation of the first selenium precursor solution in step S101 may comprise the following sub-steps: mixing a selenium precursor and a first selenium precursor solvent in a ratio of 0.1~10 mmol:1~20 mL to form the first selenium precursor solution. The phrase "mixing a selenium precursor and a first selenium precursor solvent in a ratio of 0.1~10 mmol:1~20 mL" means that in the synthesis process, the actual amount of the selenium precursor is 0.1~10 mmol, and the actual amount of the first selenium precursor solvent is 1~20 mL. Or, it means that in the synthesis process, the actual amount of the selenium precursor is x*(0.1~10 mmol), and the actual amount of the first selenium precursor solvent is x*(1~20 mL), where x>0, that is, 0.1~10 mmol:1~20 mL is not necessarily the ratio of the actual amount of the selenium precursor:the first selenium precursor solvent, but may be the ratio of their actual amount after taking the common divisor or common multiple. For example, when the value of x is 2, the actual amount of the selenium precursor can be 0.2~20 mmol, and the actual amount of the first selenium precursor solvent can be 2~40 mL. Whether it is laboratory synthesis or actual large-scale process production, the method and raw materials provided in this step can be satisfied.

In the first selenium precursor solution, the selenium precursor is referred as the solute in the first selenium precursor solution, and the first selenium precursor solvent is referred as the solvent in the first selenium precursor solution. The selenium precursor can be selected from one of selenium dioxide, selenium trioxide, selenium powder, sodium selenate, and the like. In this step, the material selection and amount of the selenium precursor have a very critical effect on the growth of large-scale blue-emitting ZnSe quantum dot. The first selenium precursor solvent may comprise a phosphine solvent having active electrons. Due to the existence of active electrons, the electron pair on the phosphorus atom in the phosphine solvent can combine with the selenium in the selenium precursor to form a strong coordination bond, thereby forming a phosphine-selenium compound anion precursor with higher reactivity. The phosphine selenium compound anion precursor easily reacts with metal cations (such as zinc cations). The phosphine solvent can be selected from, for example, one of trioctylphosphine, tributylphosphine, tris(trimethylsilyl)phosphine, tris(dimethylamino)phosphine, diphenylphosphine, diethylphosphine, bis(2-methoxyphenyl)phosphine, tris(diethylamino)phosphine.

In some embodiments, the preparation of the second selenium precursor solution in step S101 may comprise the following sub-steps: mixing a selenium precursor and a second selenium precursor solvent in a ratio of 0.1~10 mmol:1~20 mL to form the second selenium precursor solution. Here, the explanation about "mixing a selenium precursor and a second selenium precursor solvent in a ratio of 0.1~10 mmol:1~20 mL" is the same as the explanation above about the first selenium precursor solution, so for the sake of brevity, not described again. Whether it is laboratory synthesis or actual large-scale process production, the method and raw materials provided in this step can be satisfied. In the second selenium precursor solution, the selenium precursor is referred as the solute in the second selenium precursor solution, and the second selenium precursor solvent is referred as the solvent in the second selenium precursor solution. The selenium precursor can be selected from one of selenium dioxide, selenium trioxide, selenium powder, sodium selenate, and the like. In this step, the material selection and amount of the selenium precursor have a very critical effect on the growth of large-scale blue-emitting ZnSe quantum dot. The second selenium precursor solvent may comprise an inert solvent having inactive electrons. After the inert solvent is combined with selenium in the selenium precursor, the activity of selenium can be reduced. The inert solvent can be an inert organic solvent with a boiling point higher than 200° C., comprising but not limited to tetradecane, hexadecane, octadecane, eicosane, tetracosane, octadecene, phenyl ether, benzyl ether, liquid paraffin, mineral oil, dodecylamine, hexadecylamine, octadecylamine.

It should be noted that although the above embodiments describe their respective preparation methods in the order of the first zinc precursor solution, the second zinc precursor solution, the first selenium precursor solution, and the second selenium precursor solution. However, the order of description is only for the convenience of readers to understand the present disclosure, and does not represent their actual preparation order. The actual preparation order of the first zinc precursor solution, the second zinc precursor solution, the first selenium precursor solution, and the second selenium precursor solution can be flexibly selected according to actual process requirements.

In some embodiments, adding the first selenium precursor solution to the second zinc precursor solution to form an intermediate of ZnSe quantum dot in step S102 may comprise the following sub-steps: quickly injecting the first selenium precursor solution prepared in the above embodiment into the second zinc precursor solution prepared in the above embodiment, and reacting for 1 minute to 3 hours to form the intermediate of blue-emitting ZnSe quantum dot. The particle size of the intermediate of ZnSe quantum dot is in the range of 3~10 nm, and the fluorescence emission peak is in the range of 400~455 nm. Here, "quickly injecting the first selenium precursor solution prepared in the above embodiment into the second zinc precursor solution prepared in the above embodiment" means that the first selenium precursor solution is injected (for example, dripping, pouring) at a certain flow rate into the second zinc precursor solution, instead of adding the second zinc precursor solution to the first selenium precursor solution. Because the second zinc precursor solution usually needs to be kept in a solution state and has reactive activity under high temperature conditions (such as 250° C.~350° C.), while the selenium precursor can be prepared at room temperature. If the second zinc precursor solution is added to the first selenium precursor solution, the desired result of the present disclosure cannot be obtained. "Quickly injecting" can be understood as adding the prepared first selenium precursor solution to the second zinc precursor solution very quickly and in time once the second zinc precursor solution is prepared. That is, the two operations of completing the preparation of the second zinc precursor solution and adding the first selenium precursor solution are as consistent as possible, and no blank time is between these two operations, if possible.

It should be noted that, as mentioned above, in the first selenium precursor solution, the selenium precursor and the first selenium precursor solvent are mixed in a ratio of x*(0.1~10 mmol:1~20 mL); in the second zinc precursor solution, zinc inorganic salt, organic acid, organic amine and inert solvent are mixed in the ratio of x*(0.1~10 mmol:1~10 mL:1~10 mL:1~20 mL), x>0. In the actual synthesis process, the volume ratio of the first selenium precursor solution and the second zinc precursor solution can be roughly in the range of 0.1~20:0.3~40. In an example, the volume of the first selenium precursor solution may be approximately in the range of 0.1~20 mL, and the volume of the second zinc precursor solution may be approximately in the range of 0.3~40 mL. In another example, the volume of the first selenium precursor solution may be approximately in the range of 0.1~20 L, and the volume of the second zinc precursor solution may be approximately in the range of 0.3~40 L. Whether it is laboratory synthesis or actual large-scale process production, the method provided in this step can be satisfied.

In some embodiments, step S103 "performing the following step at least once to form the ZnSe quantum dot: sequentially adding the first zinc precursor solution and the second selenium precursor solution to the intermediate of the ZnSe quantum dot and making them react" may comprise the following sub-steps: under 250° C.~350° C., sequentially adding the first zinc precursor solution at room temperature and the second selenium precursor solution at room temperature prepared in the above embodiment to the intermediate of the ZnSe quantum dot prepared in step S102 with a temperature in the range of 250° C. to 350° C., and reacting for 1 minute to 2 hours, continuing to grow a cladding layer outside the intermediate of ZnSe quantum dot. This sub-step is performed at least once until the ZnSe quantum dot of the required size is grown. Then, adding excess n-hexane to the above solution to stop the reaction, transferring the above solution to a centrifuge tube, centrifuging at 7000 rpm for about 3 minutes, pouring out the supernatant in the centrifuge tube, and finally obtaining the blue emitting ZnSe quantum dot with desired size.

The number of times of performing the above operations can be determined according to factors such as the size of the required ZnSe quantum dot, the reaction time, the reaction temperature, the amount and ratio of the reactants, and the like, and the number of times of performing the above operations is not limited in this embodiment. For example, the above operations can be performed once, twice, three times, four times or more.

It should be noted that if the ZnSe quantum dot with the desired size can be obtained by performing the operation of step S103 once, the product prepared in step S102 is the intermediate of ZnSe quantum dot, and the product prepared in step S103 is the final product, that is, the final ZnSe quantum dot with the required size. If the ZnSe quantum dot with the desired size can be obtained by performing the operation of step S103 N times, the intermediate prepared in step S102 and the products obtained from all N-1 operations before the $N^{th}$ operation are the intermediates of the ZnSe quantum dot, the product prepared by the $N^{th}$ operation is the final product, that is, the final ZnSe quantum dot with the required size. For example, the intermediate obtained from the first time to perform the sub-step "under 250° C.~350° C., sequentially adding the first zinc precursor solution at room temperature and the second selenium precursor solution at room temperature to the intermediate of the ZnSe quantum dot prepared in step S102 with a temperature in the range of 250° C. to 350° C., and reacting for 1 minute to 2 hours" can be called the first intermediate of ZnSe quantum dot; the intermediate obtained from the second time to perform the sub-step "under 250° C.~350° C., sequentially adding the first zinc precursor solution at room temperature and the second selenium precursor solution at room temperature to the first intermediate of the ZnSe quantum dot with a temperature in the range of 250° C. to 350° C., and reacting for 1 minute to 2 hours" can be called the second intermediate of ZnSe quantum dot; the intermediate obtained from the $(N-1)^{th}$ time to perform the sub-step "under 250° C.~350° C., sequentially adding the first zinc precursor solution at room temperature and the second selenium precursor solution at room temperature to the $(N-2)^{th}$ intermediate of the ZnSe quantum dot with a temperature in the range of 250° C. to 350° C., and reacting for 1 minute to 2 hours" can be called the $(N-1)^{th}$ intermediate of ZnSe quantum dot; and the final product obtained from the $N^{th}$ time to perform the sub-step "under 250° C.~350° C., sequentially adding the first zinc precursor solution at room temperature and the second selenium precursor solution at room temperature to the (N−1)th intermediate of the ZnSe quantum dot with a temperature in the range of 250° C. to 350° C., and reacting for 1 minute to 2 hours" can be called the final ZnSe quantum dot. Here, N can be a positive integer greater than or equal to 3. It should be noted that in the step S103, the respective concentrations of the first zinc precursor solution and the second selenium precursor solution added each time may be the same or different from the previous time. For example, the respective concentrations of the first zinc precursor solution and the second selenium precursor solution added during the $N^{th}$ execution of the sub-step and the respective concentrations of the first zinc precursor solution and the second selenium precursor solution added during the $(N-1)^{th}$ execution of the sub-step may be the same or different. In case of different, the respective concentrations of the first zinc precursor solution and the second selenium precursor solution added during the $N^{th}$ execution of the sub-step may be higher or lower than the respective concentrations of the first zinc precursor solution and the second selenium precursor solution added during the $(N-1)^{th}$ execution of the sub-step, which is not limited in the embodiments of the present disclosure.

It should be noted that this step can be performed directly following step S102 without cleaning the intermediate of ZnSe quantum dot prepared in step S102. This can greatly simplify the preparation process and reduce the process difficulty. Therefore, if necessary, step S102 and step S103 can be combined into one step. In this step, the first zinc precursor solution is firstly added to the intermediate of ZnSe quantum dot prepared in step S102, and then the second selenium precursor solution is added. This sequence of operations facilitates the growth of large-scale ZnSe quantum dot.

The particle size range of the ZnSe quantum dot formed in step S103 comprises the range of 10~15 nm, the fluorescence emission peak is approximately in the range of 455~470 nm, the full width at half maximum of the fluorescence is less than 30 nm, and the fluorescence quantum yield is approximately 21%. It should be noted that although it is described here as "the particle size range of the ZnSe quantum dot comprises the range of 10~15 nm", as the word "comprises" conveys the open semantics, the particle size range of the ZnSe quantum dot is not limited to the range of 10~15 nm. For example, in the actual preparation process, ZnSe quantum dot with a particle size slightly smaller than 10 nm (for example, 9.9 nm) and a particle size slightly larger than 15 nm (for example, 15.1 nm) can also be prepared. Similarly, the "fluorescence emission peak in the range of approximately 455~470 nm" described here does not exclude that the ZnSe quantum dot may also have fluorescence emission peaks in other wavelength ranges. For example, in the actual preparation process, the fluorescence emission peak of the ZnSe quantum dot can also be slightly smaller than 455 nm (for example, 454 nm) and slightly larger than 470 nm (for example, 471 nm).

The method provided by the embodiments of the present disclosure is environmentally friendly and pollution-free because there is no heavy metal ion $Cd^{2+}$ which is highly toxic and has serious environmental pollution. In addition, the method has simple reaction system, readily available raw materials, easy operation, and mild conditions, and has great application value whether it is in laboratory synthesis or actual large-scale process production. In addition, the embodiments of the present disclosure form the required ZnSe quantum dot by first adding the first selenium precursor solution with high reaction activity and then adding the second selenium precursor solution with low reaction activity, and combining the method of multi-step precursor thermal injection. Through this method, ZnSe quantum dot with a particle size in the range of 3~15 nm can be formed, which solves the technical problem that the particle size of ZnSe quantum dot cannot exceed 10 nm in related art. Since the emission wavelength of ZnSe quantum dot can be controlled by changing the particle size of ZnSe quantum dot, the fluorescence emission peak of ZnSe quantum dot prepared by this method can be achieved in the range of 400 to 470 nm, especially in the range of 455 to 470 nm, which solves the technical problem that the fluorescence emission peak of ZnSe quantum cannot exceed 455 nm in related art, and help reduce or even avoid harmful blue light (wavelength at 400~450 nm) to human eyes. In addition, the full width at half maximum of the fluorescence of the ZnSe quantum dot prepared by this method is less than 30 nm, so the fluorescence emission spectrum emitted by the ZnSe quantum dot has better color purity and color saturation. The ZnSe quantum dot prepared by the method does not contain cadmium and lead, and has good stability to water, oxygen, etc., and can be widely used in the display field. Furthermore, continuing to clad the blue-emitting ZnSe quantum dot is expected to produce blue-emitting ZnSe system quantum dot with higher fluorescence quantum yield for display applications, which will greatly promote the application process of ZnSe system materials in the display field.

In the following, a specific example will be used to describe the preparation method of ZnSe quantum dot.

Step S101, preparing a first zinc precursor solution, a second zinc precursor solution, a first selenium precursor solution, and a second selenium precursor solution with a lower reaction activity than the first selenium precursor solution.

Preparation of the first zinc precursor solution: weigh 4 mmol zinc acetate, 2 mmol oleic acid, 4 mL oleylamine and 20 mL octadecene and mix them. Under the protection of inert gas, stir the mixture and heat it to obtain the first zinc precursor solution.

Preparation of the second zinc precursor solution: weigh 1 mmol zinc acetate, 2 mL oleic acid, 2 mL oleylamine, and 10 mL octadecene and mix them. Under the protection of inert gas, stir the mixture and heat it to 280° C., to obtain the second zinc precursor solution.

Preparation of the first selenium precursor solution: weigh 1 mmol selenium powder and 2 mL diphenylphosphine and mix them to obtain the first selenium precursor solution.

Preparation of the second selenium precursor solution: weigh 4 mmol selenium powder and 20 mL octadecene and mix them to obtain the second selenium precursor solution.

It should be noted that although the above examples describe their respective preparation methods in the order of the first zinc precursor solution, the second zinc precursor solution, the first selenium precursor solution, and the second selenium precursor solution, the order of description is only in order to facilitate readers to understand the present disclosure, it does not represent their actual preparation sequence. The actual preparation sequence of the first zinc precursor solution, the second zinc precursor solution, the first selenium precursor solution, and the second selenium precursor solution can be flexibly selected according to actual process requirements.

Figure 2:
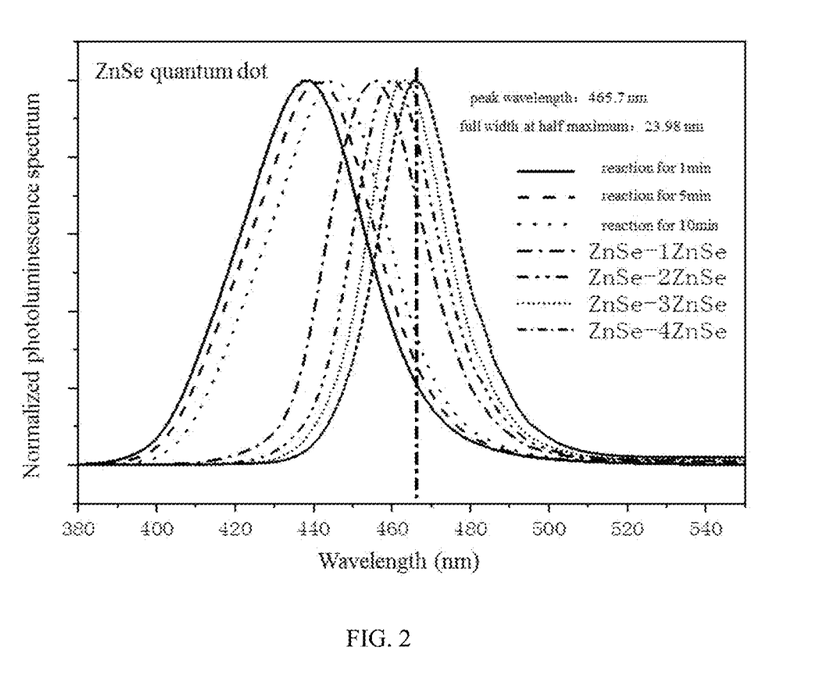
FIG. 2 illustrates fluorescence spectra respectively emitted by the intermediates of ZnSe quantum dot and the ZnSe quantum dots formed according to the method of FIG. 1 at different stages.
Figure 3:
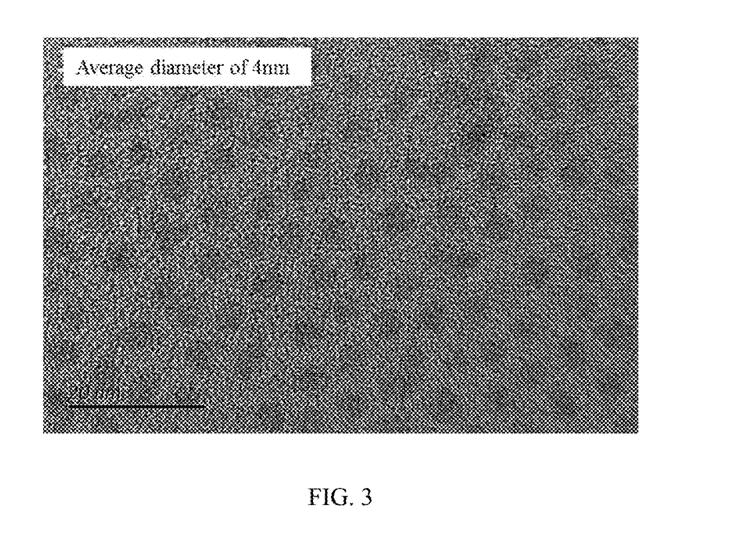
FIG. 3 illustrates a transmission electron microscope picture of the intermediates of ZnSe quantum dot prepared according to embodiments of the present disclosure.

Step S102, adding the first selenium precursor solution to the second zinc precursor solution to form an intermediate of ZnSe quantum dot. Quickly injecting the first selenium precursor solution prepared above into the second zinc precursor solution, reacting for 30 minutes to obtain the intermediate of blue-emitting ZnSe quantum dot with high quantum yield. FIG. 2 illustrates the fluorescence spectra of intermediates of ZnSe quantum dot under different reaction times. FIG. 2 illustrates seven fluorescence emission spectra, among them, in the direction from short wavelength to long wavelength along the abscissa, that is, from left to right, the three leftmost fluorescence emission spectra correspond to the fluorescence spectra of intermediates of ZnSe quantum dot with the reaction time of 1 minute, 5 minutes, and 10 minutes, respectively. It can be seen from FIG. 2 that as the reaction time gradually increases, the peak wavelength of the fluorescence emission spectrum of the intermediates of ZnSe quantum dot also gradually increases (that is, gradually shifts to the right). FIG. 3 illustrates a transmission electron microscope (TEM) picture of the reaction system at the reaction time of 20 minutes. As illustrated in FIG. 3, the average diameter of the intermediates of ZnSe quantum dot is 4 nm after the reaction for 20 minutes.

Step S103, performing the following step at least once to form the ZnSe quantum dot: sequentially adding the first zinc precursor solution and the second selenium precursor solution to the intermediate of the ZnSe quantum dot and making them react.

It does not need to clean the intermediate of the ZnSe quantum dot prepared above, the continuous growth of ZnSe is directly carried out on the basis of the intermediate of the ZnSe quantum dot. Under 280° C., firstly adding the first zinc precursor solution at room temperature to the intermediate of the ZnSe quantum dot prepared in step S102, then adding the second selenium precursor solution at room temperature, and reacting for 15 minutes, the continuous growth is conducted on the basis of the intermediate of ZnSe quantum dot. Perform the above operation four times, then add excess n-hexane to the above solution to stop the reaction, and transfer the above solution to a centrifuge tube. After centrifugation at 7000 rpm for about 3 minutes, discard the supernatant in the centrifuge tube, finally, blue-emitting ZnSe quantum dots with the required size are obtained. The fluorescence quantum yield of the ZnSe quantum dots prepared by the above method is about 21%.

It should be noted that the phrase "perform the above operations four times" specifically refers to: under 280° C., adding the first zinc precursor solution to the intermediate of the ZnSe quantum dot prepared in step S102 and then adding the second zinc precursor solution for the first time, reacting for 15 minutes to continue to grow on the outside of the intermediate of the ZnSe quantum dot, and the particle size of the obtained ZnSe quantum dot is increased compared with the particle size of the ZnSe quantum dot in step S102. Then, under 280° C., adding the first zinc precursor solution at room temperature to the ZnSe quantum dot obtained above and then adding the second selenium precursor solution at room temperature for the second time, and reacting for 15 minutes to make the ZnSe quantum dot continue to grow, and the particle size of the obtained ZnSe quantum dot is increased compared with the particle size of the ZnSe quantum dot when the first zinc precursor solution and the second selenium precursor solution are added for the first time. Then, under 280° C., adding the first zinc precursor solution at room temperature to the ZnSe quantum dot obtained above and then adding the second selenium precursor solution at room temperature for the third time, and reacting for 15 minutes to make the ZnSe quantum dot continue to grow, and the particle size of the obtained ZnSe quantum dot is increased compared with the particle size of the ZnSe quantum dot when the first zinc precursor solution and the second selenium precursor solution are added for the second time. Finally, under 280° C., adding the first zinc precursor solution at room temperature to the ZnSe quantum dot obtained above and then adding the second selenium precursor solution at room temperature for the fourth time, and reacting for 15 minutes to make the ZnSe quantum dot continue to grow, and the particle size of the obtained ZnSe quantum dot is increased compared with the particle size of the ZnSe quantum dot when the first zinc precursor solution and the second selenium precursor solution are added for the third time.

In this step, the first zinc precursor solution is added first, and then the second selenium precursor solution is added. This sequence of operations is conducive to the growth of large-scale ZnSe quantum dot.

Continuing to refer to FIG. 2, the four fluorescence emission spectra on the far right in FIG. 2, along the abscissa from short wavelength to long wavelength, that is, from left to right, respectively corresponding to the fluorescence emission spectra of one operation (that is, adding the first zinc precursor solution and then the second selenium precursor solution, and reacting for 15 minutes), the fluorescence emission spectra of two operations (that is, adding the first zinc precursor solution and then the second selenium precursor solution, reacting for 15 minutes; then adding the first zinc precursor solution and then the second selenium precursor solution, reacting for 15 minutes), the fluorescence emission spectra of three operations (that is, adding the first zinc precursor solution and then the second selenium precursor solution, reacting for 15 minutes; then adding the first zinc precursor solution and then the second selenium precursor solution, reacting for 15 minutes; then adding the first zinc precursor solution and then the second selenium precursor solution, reacting for 15 minutes), and the fluorescence emission spectra of four operations (that is, adding the first zinc precursor solution and then the second selenium precursor solution, reacting for 15 minutes; then adding the first zinc precursor solution and then the second selenium precursor solution, reacting for 15 minutes; then adding the first zinc precursor solution and then the second selenium precursor solution, reacting for 15 minutes; then adding the first zinc precursor solution and then the second selenium precursor solution, reacting for 15 minutes). As illustrated in FIG. 2, the fluorescence emission peak of the leftmost fluorescence emission spectrum of the four rightmost fluorescence emission spectra is about 455 nm, and the fluorescence emission peak of the rightmost fluorescence emission spectrum of the four rightmost fluorescence emission spectra is 465.7 nm. The full width at half maximum of the fluorescence is 23.98 nm.

Figure 4:
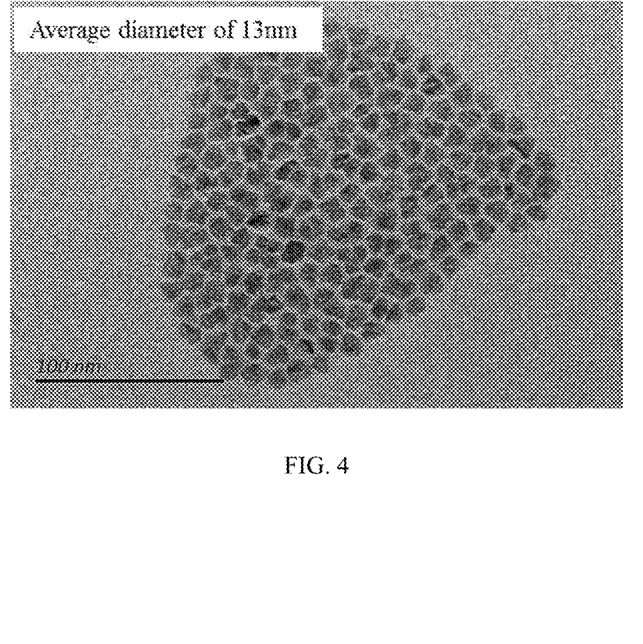
FIG. 4 illustrates a transmission electron microscope picture of ZnSe quantum dots prepared according to embodiments of the present disclosure.

FIG. 4 illustrates a transmission electron microscope picture of the ZnSe quantum dots formed in step S103. As illustrated in FIG. 4, the average diameter of the ZnSe quantum dots is about 13 nm.

Figure 5:
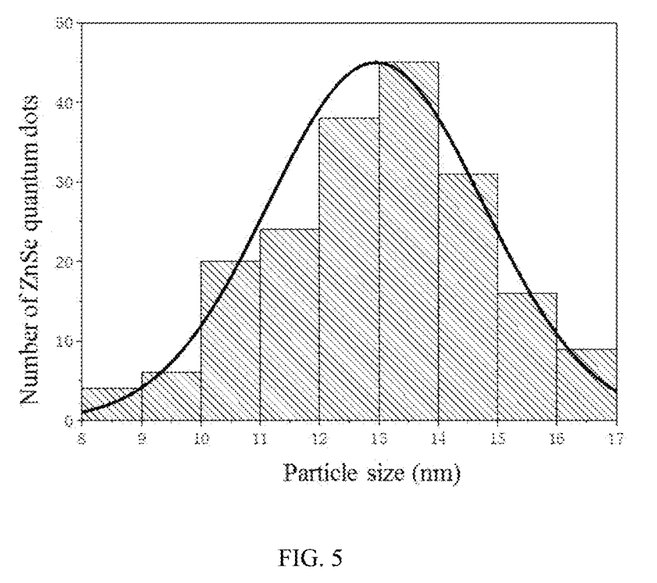
FIG. 5 illustrates a size distribution diagram of ZnSe quantum dots prepared according to embodiments of the present disclosure.

FIG. 5 illustrates the size distribution diagram of the ZnSe quantum dots formed in step S103. The size distribution diagram illustrated in FIG. 5 counts a total of 193 ZnSe quantum dots. The average diameter of the 193 ZnSe quantum dots is 12.95 nm, the standard deviation is 1.80 nm, and the minimum diameter is 8.1 nm and the maximum diameter is 16.7 nm.

Figure 6:
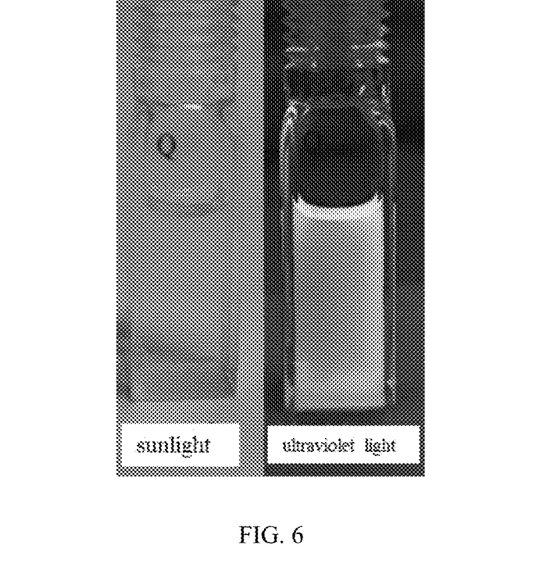
FIG. 6 illustrates a comparison diagram of ZnSe quantum dots prepared according to embodiments of the present disclosure under sunlight and ultraviolet light.

FIG. 6 illustrates a comparison diagram of the ZnSe quantum dots formed in step S103 under sunlight (left) and ultraviolet light (right). Although it seems that the color of ZnSe quantum dots under sunlight and the color of ZnSe quantum dots under ultraviolet light cannot be seen intuitively from this picture due to the grayscale processing of the picture, the picture can intuitively shows the difference in color between the two. In the actual experimental measurement results, the ZnSe quantum dots under sunlight irradiation appear light green, and the ZnSe quantum dots under ultraviolet light irradiation appear blue. That is, under ultraviolet light irradiation, ZnSe quantum dots can achieve blue light emission with an emission band between 455 and 470 nm and a high luminous intensity.

The preparation method provided in this example has basically the same technical effect as the preparation method described in the previous embodiments. Therefore, for the sake of brevity, the technical effect will not be repeated here.

According to another aspect of the present disclosure, a ZnSe quantum dot is provided. The ZnSe quantum dot can be prepared by the method described in any of the foregoing embodiments. The range of the fluorescence emission peak of the ZnSe quantum dot comprises a range greater than 455 nm and less than or equal to 470 nm, and the full width at half maximum of the fluorescence is less than 30 nm. The range of the particle size of the ZnSe quantum dots comprises the range of 10~15 nm. As mentioned above, although it is described here as "the range of the fluorescence emission peak of the ZnSe quantum dot comprises a range greater than 455 nm and less than or equal to 470 nm", as the open meaning conveyed by the word "comprises", it does not exclude that the ZnSe quantum dots can also have fluorescence emission peaks in other wavelength ranges. For example, the fluorescence emission peak of the ZnSe quantum dots may also be slightly smaller than 455 nm (for example, 454 nm) and slightly larger than 470 nm (for example, 471 nm). Similarly, although it is described here as "the range of the particle size of the ZnSe quantum dots comprises the range of 10~15 nm", as the open meaning conveyed by the word "comprises", the range of the particle size of the ZnSe quantum dots does not limit to the range of 10~15 nm. For example, the ZnSe quantum dots may also comprise ZnSe quantum dots with a particle size slightly smaller than 10 nm (for example, 9.9 nm) and a particle size slightly larger than 15 nm (for example, 15.1 nm).

For the ZnSe quantum dots provided by the embodiments of the present disclosure, its particle size is in the range of 10~15 nm, its full width at half maximum of the fluorescence is less than 30 nm, and its fluorescence emission peak is in the range of 455~470 nm, thereby solving the technical problem that the fluorescence emission peak of ZnSe quantum dots cannot exceed 455 nm and the particle size cannot exceed 10 nm in related art, which is beneficial to reduce or even avoid harmful blue light (wavelength at 400~450 nm) to human eyes. The ZnSe quantum dots do not contain cadmium and lead, environmentally friendly, no pollution, good stability to water, oxygen, etc., and can be widely used in the display field.

The prepared ZnSe quantum dots can be used alone in products to provide blue light emission, or can be used after they are coated with at least one shell. According to another aspect of the present disclosure, a ZnSe structure is provided. The ZnSe structure comprises the ZnSe quantum dot described in any of the foregoing embodiments and at least one shell covering the surface of the ZnSe quantum dot. The material of the at least one shell may be any suitable material, which is not specifically limited in the embodiments of the present disclosure. For example, the at least one shell may be selected from one or more of ZnS, ZnTe, ZnSeS, ZnSeTeS, ZnSeTe, CdS, CdSe, CdSeS, and InP. The preparation process of the at least one shell can refer to the conventional quantum dot shell preparation process in the art, which is not specifically limited in the embodiments of the present disclosure.

According to still another aspect of the present disclosure, there is provided a display device comprising the ZnSe quantum dots or ZnSe structure described in any of the foregoing embodiments.

Figure 7:
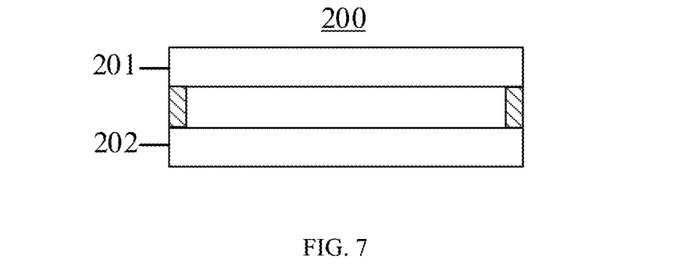
FIG. 7 illustrates a schematic structural diagram of a display device comprising the ZnSe quantum dot according to an embodiment of the present disclosure.

FIG. 7 illustrates a schematic structural diagram of the display device 200. As illustrated in FIG. 7, the display device 200 comprises a first substrate 201, a second substrate 202 disposed opposite to the first substrate 201, and other necessary components disposed between the two. The display device 200 comprises, but is not limited to, a liquid crystal display (LCD), an organic light emitting diode (OLED) display device, a micro light emitting diode (Micro LED) display device, and the like.

The display device 200 comprises a photoelectric element, and the photoelectric element may be, for example, an element such as a color film, a backlight, a light-emitting device and the like comprising the above-mentioned ZnSe quantum dots. In one example, using the photoluminescence properties of ZnSe quantum dots, ZnSe quantum dots can be used as a blue color film of a liquid crystal display device and/or a blue light source of a backlight. In another example, using the electroluminescence properties of ZnSe quantum dots, ZnSe quantum dots can be used to fabricate light-emitting devices, such as quantum dot light emitting diode (QLED). The QLED comprises a cathode, an electron transport layer, a ZnSe quantum dot layer, a hole transport layer, a hole injection layer, and an anode. When a voltage is applied between the anode and the cathode, under the action of an electric field, the cathode and the anode respectively generate electrons and holes. The electrons and holes are transported to the ZnSe quantum dot layer through the corresponding film layer (s), and recombined into excitons in the ZnSe quantum dot layer to produce energy level transitions, thereby emitting light. According to specific design requirements, the QLED can be a front-mounted structure or an inverted structure, and can be a top-emission type or a bottom-emission type. Compared with traditional organic light-emitting diodes, the QLED has better color purity, better contrast, and stronger stability.

The display device provided by the embodiments of the present disclosure may have basically the same technical effects as the ZnSe quantum dots described in the previous embodiments. Therefore, for the sake of brevity, the technical effects of the display device will not be repeated here.

As those skilled in the art will understand, although the various steps of the method in the present disclosure are described in a specific order in the accompanying drawings, this does not require or imply that these steps must be performed in the specific order, unless the context clearly dictates otherwise. Additionally or alternatively, multiple steps can be combined into one step for execution, and/or one step can be decomposed into multiple steps for execution. In addition, other method steps can be inserted between the steps. The inserted step may represent an improvement of the method such as described herein, or may be unrelated to the method. In addition, a given step may not be fully completed before the next step starts.

In the description of the present disclosure, the terms "upper", "lower", "left", "right", etc. indicate the orientation or positional relationship based on the orientation or positional relationship illustrated in the drawings, and are only used to facilitate the description of the present disclosure. It is not required that the present disclosure must be constructed and operated in a specific orientation, and therefore cannot be understood as a limitation to the present disclosure.

In the description of this specification, the description with reference to the terms "one embodiment", "another embodiment", etc. means that a specific feature, structure, material, or characteristic described in conjunction with the embodiment is comprised in at least one embodiment of the present disclosure. In this specification, the schematic representations of the above terms do not necessarily refer to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without contradicting each other. In addition, it should be noted that in this specification, the terms "first" and "second" are only used for descriptive purposes, and cannot be understood as indicating or implying relative importance or implicitly indicating the number of indicated technical features.

The above are only specific implementations of the present disclosure, but the protection scope of the present disclosure is not limited thereto. Any person familiar with the technical field can easily think of changes or substitutions within the technical scope disclosed in the present disclosure, and they should be covered by the protection scope of the present disclosure. Therefore, the protection scope of the present disclosure should be subject to the protection scope of the claims.

The invention claimed is:

1. A method for preparing a ZnSe quantum dot, comprising the following operations:
   preparing a first zinc precursor solution, a second zinc precursor solution, a first selenium precursor solution, and a second selenium precursor solution with a lower reaction activity than the first selenium precursor solution;
   adding the first selenium precursor solution to the second zinc precursor solution to form an intermediate of the ZnSe quantum dot; and
   performing the following operation at least once to form the ZnSe quantum dot:
   sequentially adding the first zinc precursor solution and the second selenium precursor solution to the intermediate of the ZnSe quantum dot and making the first zinc precursor solution, the second selenium precursor solution, and the intermediate of the ZnSe quantum dot react;
   wherein the performing the following operation at least once to form the ZnSe quantum dot comprises:
   under 250° C.~350° C., sequentially adding the first zinc precursor solution at room temperature and the second selenium precursor solution at room temperature to the intermediate of the ZnSe quantum dot, and reacting for 1 minute to 2 hours, repeating this operation at least once to form the ZnSe quantum dot.

2. The method of claim 1, wherein a ratio of solute to solvent in the first zinc precursor solution is different from a ratio of solute to solvent in the second zinc precursor solution.

3. The method of claim 2, wherein a fluorescence emission peak of the ZnSe quantum dot is in a range of 455~470 nm.

4. The method of claim 2, wherein a particle size of the ZnSe quantum dot is in a range of 10~15 nm.

5. The method of claim 2, wherein a full width at half maximum of a fluorescence of the ZnSe quantum dot is less than 30 nm.

6. The method of claim 2, wherein the preparing a first zinc precursor solution, a second zinc precursor solution, a first selenium precursor solution, and a second selenium precursor solution with a lower reaction activity than the first selenium precursor solution comprises:
mixing zinc inorganic salt, organic acid, organic amine and inert solvent in a ratio of 1~10 mmol:1~10 mmol:1~10 mL:10~50 mL, stirring the mixture under protection of inert gas and heating the mixture until clear to form the first zinc precursor solution.

7. The method of claim 2, wherein the preparing a first zinc precursor solution, a second zinc precursor solution, a first selenium precursor solution, and a second selenium precursor solution with a lower reaction activity than the first selenium precursor solution comprises:
mixing zinc inorganic salt, organic acid, organic amine and inert solvent in a ratio of 0.1~10 mmol:1~10 mL:1~10 mL:1~20 mL, stirring the mixture under protection of inert gas and heating the mixture to 250° C.~350° C. to form the second zinc precursor solution.

8. The method of claim 7, wherein the adding the first selenium precursor solution to the second zinc precursor solution to form an intermediate of the ZnSe quantum dot comprises:
quickly injecting the first selenium precursor solution into the second zinc precursor solution and reacting for 1 minute to 3 hours to form the intermediate of the ZnSe quantum dot with a particle size in a range of 3~10 nm, wherein a volume ratio of the first selenium precursor solution to the second zinc precursor solution is in a range of 0.1~20:0.3~40.

9. The method of claim 1, wherein the preparing a first zinc precursor solution, a second zinc precursor solution, a first selenium precursor solution, and a second selenium precursor solution with a lower reaction activity than the first selenium precursor solution comprises:
mixing a selenium precursor and a first selenium precursor solvent in a ratio of 0.1~10 mmol:1~20 mL to form the first selenium precursor solution.

10. The method of claim 9 wherein the selenium precursor is selected from one of selenium dioxide, selenium trioxide, selenium powder, or sodium selenate.

11. The method of claim 9, wherein the first selenium precursor solvent comprises a phosphine solvent with active electrons.

12. The method of claim 11, wherein the phosphine solvent is selected from one of trioctylphosphine, tributylphosphine, tris(trimethylsilyl)phosphine, tris(dimethylamino)phosphine, diphenylphosphine, diethylphosphine, bis(2-methoxyphenyl)phosphine, or tris(diethylamino)phosphine.

13. The method of claim 1, wherein the preparing a first zinc precursor solution, a second zinc precursor solution, a first selenium precursor solution, and a second selenium precursor solution with a lower reaction activity than the first selenium precursor solution comprises:
mixing a selenium precursor and a second selenium precursor solvent in a ratio of 0.1~10 mmol:1~20 mL to form the second selenium precursor solution.

14. The method of claim 13, wherein the second selenium precursor solvent comprises an inert solvent.

15. The method of claim 14, wherein the inert solvent is selected from one of tetradecane, hexadecane, octadecane, eicosane, tetracosane, octadecene, phenyl ether, benzyl ether, liquid paraffin, mineral oil, dodecylamine, hexadecylamine, or octadecylamine.

16. A ZnSe quantum dot prepared by the method of claim 1, wherein a fluorescence emission peak of the ZnSe quantum dot is in a range greater than 455 nm and less than or equal to 470 nm, a particle size of the ZnSe quantum dot is in a range of 10~15 nm, and a full width at half maximum of fluorescence of the ZnSe quantum dot is less than 30 nm.

17. A ZnSe structure comprising the ZnSe quantum dot of claim 16 and at least one shell covering a surface of the ZnSe quantum dot.

18. The ZnSe structure of claim 17, wherein a material of the at least one shell is selected from one or more of ZnS, ZnTe, ZnSeS, ZnSeTeS, ZnSeTe, CdS, CdSe, CdSeS, or InP.

19. A display device comprising the ZnSe quantum dot of claim 16.

20. A display device comprising the ZnSe structure of claim 17.

* * * * *